United States Patent
Wada et al.

(10) Patent No.: US 11,247,745 B2
(45) Date of Patent: Feb. 15, 2022

(54) ELECTRIC VEHICLE

(71) Applicant: Suzuki Motor Corporation, Hamamatsu (JP)

(72) Inventors: Masayoshi Wada, Hamamatsu (JP); Tomoya Sato, Hamamatsu (JP); Gopinath Raja, Hamamatsu (JP); Shunya Sakurai, Hamamatsu (JP)

(73) Assignee: SUZUKI MOTOR CORPORATION

( * ) Notice: Subject to any disclaimer, the term of this patent is extended or adjusted under 35 U.S.C. 154(b) by 33 days.

(21) Appl. No.: 16/924,430

(22) Filed: Jul. 9, 2020

(65) Prior Publication Data

US 2021/0061396 A1  Mar. 4, 2021

(30) Foreign Application Priority Data

Aug. 27, 2019 (JP) .............................. JP2019-154787

(51) Int. Cl.
*B62K 5/007* (2013.01)
*A61G 5/04* (2013.01)
*A61H 3/04* (2006.01)

(52) U.S. Cl.
CPC ............... *B62K 5/007* (2013.01); *A61G 5/04* (2013.01); *A61H 3/04* (2013.01); *A61H 2003/043* (2013.01); *B62B 2206/02* (2013.01)

(58) Field of Classification Search
CPC .... B62K 5/007; B62K 3/022; B62K 2206/02; A61G 5/04; A61G 5/0833; A61G 5/0866; A61H 3/04; A61H 2003/043; A61H 3/005; B60P 3/423
See application file for complete search history.

(56) References Cited

U.S. PATENT DOCUMENTS

| | | | |
|---|---|---|---|
| 6,340,168 B1 * | 1/2002 | Woleen | A61G 5/08 135/66 |
| 2007/0096436 A1 * | 5/2007 | Willis | A61G 5/0866 280/650 |
| 2009/0315300 A1 * | 12/2009 | Stiba | B62B 9/28 280/648 |

(Continued)

FOREIGN PATENT DOCUMENTS

| | | | | |
|---|---|---|---|---|
| CN | 104812655 A | * | 7/2015 | ............... B62B 3/10 |
| DE | 202012102516 U1 | * | 8/2012 | ............. B62K 3/002 |
| JP | H1085268 A | | 4/1998 | |

(Continued)

*Primary Examiner* — Steve Clemmons
(74) *Attorney, Agent, or Firm* — Lerner, David, Littenberg, Krumholz & Mentlik, LLP

(57) ABSTRACT

The electric vehicle includes a moving base in which a front base with front wheels and a rear base with rear wheels are coupled to be extendable in a front-rear direction of a vehicle, an upper frame in which upper ends of a right and left pair of frames provided upward from both right and left side portions of the rear base are coupled by an upper end frame extending in a vehicle width direction, a seat configured to be movable between a seating position and a folded position, a seat operating part operated by a user seated at the seat, a rear operating part operated by the user in a standing and walking attitude from behind the seat, a rear cover frame extending in the vehicle width direction, wherein an article accommodation portion is formed between the upper end frame and the rear cover frame.

4 Claims, 5 Drawing Sheets

(56) References Cited

U.S. PATENT DOCUMENTS

2010/0084831 A1* 4/2010 Wang .................. B60N 2/3065
                                                                280/39

FOREIGN PATENT DOCUMENTS

| JP | 2002233007 | A |   | 8/2002 | |
|----|------------|---|---|--------|---|
| JP | 2003237380 | A |   | 8/2003 | |
| JP | 2011195123 | A | * | 10/2011 | |
| JP | 2013107581 | A | * | 6/2013 | |
| JP | 2016168153 | A |   | 9/2016 | |
| WO | WO-2015053677 | A1 | * | 4/2015 | ............. B62K 5/025 |

* cited by examiner

ELECTRIC VEHICLE

CROSS-REFERENCE TO RELATED APPLICATION

The present application claims priority from Japanese Patent Application No. 2019-154787 filed Aug. 27, 2019, the disclosure of which is hereby incorporated herein by reference.

TECHNICAL FIELD

The present invention relates to an electric vehicle, and more particularly, relates to a small electric vehicle which can also be used as an electric walking aid vehicle.

BACKGROUND ART

Conventionally, as a vehicle for a user carrying a burden while walking, a small electric vehicle such as an electric wheelchair or an electric walking aid vehicle of the cart type has been used. For example, Patent Literature 1 discloses an electric vehicle having an assisted walking mode in which a caregiver or the like operates the vehicle while walking in a state in which a user is seated, in addition to a free-running mode in which the user operates the vehicle while the user is seated on the vehicle by allowing for the change of an angle of a handle and allowing the reverse of a seat to the front and rear. However, in this electric vehicle, usage as an electric walking aid vehicle in which the user himself or herself operates the vehicle while the user walking has not been considered.

CITATION LIST

Patent Literature

[Patent Literature 1] JP 2002-233007 A

DISCLOSURE OF THE INVENTION

Problem to be Solved by the Invention

A small electric vehicle has a seat, and thus, has a longer wheelbase compared to conventional electric walking aid vehicles, so that handling is poor for use as an electric walking aid vehicle. Preferably, an electric walking aid vehicle has a short vehicle length and a small turning radius. Accordingly, the inventors have developed an electric vehicle having a vehicle body which is extendable to the front and rear and a foldable seat to be suitable for use in a small electric vehicle mode and an electric walking aid vehicle mode.

In this electric vehicle, when it is used in the electric walking aid vehicle mode, an operating part provided at the rear of a seat is used. This operating part is configured such that the height is adjustable in accordance with the height or an intended use of a user. However, a stable supporting structure considering appearance and flexible routing of a signal line or a conductive line from the operating part has been required.

The present invention is made considering this point, and an object of the present invention is to obtain a stable supporting structure considering appearance of a rear operating part with an adjustable height and wiring in the electric vehicle capable of switching of the small electric vehicle mode and the electric walking aid vehicle mode.

Means for Solving the Problem

In order to solve the problem, in the present invention, there is provided an electric vehicle including:

a moving base which includes a front base with front wheels and a rear base with rear wheels, the front base and the rear base being coupled to be extendable in a front-rear direction of a vehicle;

an upper frame in which upper ends of a right and left pair of frames provided upward from both right and left side portions of the rear base are coupled by an upper end frame extending in a vehicle width direction;

a seat configured to be movable between a seating position and a folded position, in which the seat is pivotally supported around an axis in the vehicle width direction by the upper frame, and a leg portion extending downward exceeding a pivot support portion of the seat is coupled to the front base pivotally and slidably;

a seat operating part configured to be operable by a user seated at the seat; and a rear operating part configured to be operable by the user in a standing and walking attitude from behind the seat, wherein the upper frame includes a rear cover frame extending in the vehicle width direction having a gap at a lower side of the upper end frame and a cylindrical stem supporting portion which extends up and down penetrating through the upper end frame having a lower end which terminates at a bottom surface of the rear cover frame, and an article accommodation portion is formed between the upper end frame and the rear cover frame, and the rear operating part is provided on a rear handle supported with an adjustable height by the stem supporting portion.

Advantageous Effects of Invention

As described above, in the electric vehicle according to the present invention, the rear cover frame is provided at the lower side of the upper end frame and the cylindrical stem supporting portion is provided having the lower end which terminates at the bottom surface of the rear cover frame. Consequently, the stem supporting portion of the rear handle is rigidly connected at vertically two portions of the upper end frame and the rear cover frame, which is advantageous to obtaining supporting rigidity for the rear handle with an adjustable height.

Also, since a lower end portion of a stem of the rear handle is housed in the stem supporting portion, flexible routing of a signal line or a conductive line from an operating part of the rear handle can be performed within the stem supporting portion. This is advantageous in maintaining excellent appearance of this portion and also advantageous in using a hollow space for a reinforcement structure as an article accommodation portion.

MODE FOR CARRYING OUT THE INVENTION

Hereinafter, an embodiment of the present invention will be explained in detail with reference to the drawings.

Figure 1:
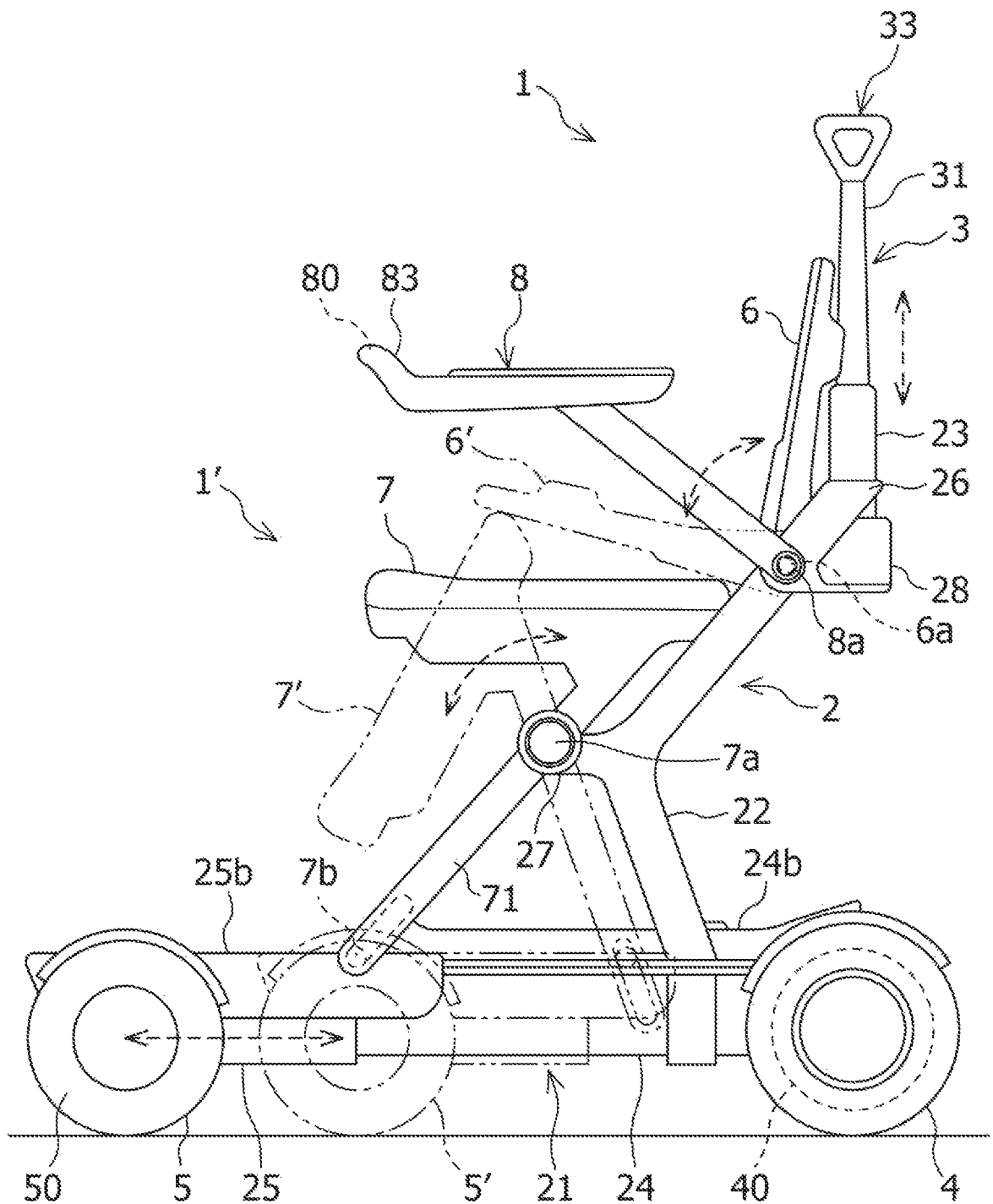
FIG. 1 is a side view showing an electric vehicle according to an embodiment of the present invention.

In FIG. 1, an electric vehicle 1 according to the embodiment of the present invention includes a vehicle body 2 constituted by a moving base 21 (a lower carrier) and an upper frame 22 provided to stand at the rear of the moving base 21 (a rear base 24), and can be used in a small electric vehicle mode (1) shown in solid lines in FIG. 1 and an electric walking aid vehicle mode (1') shown in phantom lines in FIG. 1.

The moving base 21 includes a rear base 24 (a main body portion) to which right and left rear wheels 4 (a drive wheel) and the upper frame 22 are provided and a front base 25 to which right and left front wheels 5 (a driven wheel) are provided, and the front base 25 is slidably coupled in a front-rear direction at a front side of the rear base 24 and the moving base 21 is constituted such that a wheelbase is extendable.

The right and left rear wheels 4 are independently driven by right and left motors 40 (40L, 40R) mounted to the rear base 24. The right and left front wheels 5 are constituted by an omni wheel (an omnidirectional wheel) including a number of rollers 50 which are rotatable about a circumferential axis at a grounding part. Moreover, steering and drive control operation of the electric vehicle 1 can be performed only by the control of the motors 40L, 40R by an operating part 83 (a seat operating part) or rear operating parts 33 which will be explained later.

The upper frame 22 has a basic shape of inverse U-shape or portal shape in which upper ends of a right and left pair of frames (side frames) provided upward from both right and left side portions of the rear base 24 are coupled by an upper end frame 26 extending in a vehicle width direction, and furthermore, a rear cover frame 28 is arranged to extend in the vehicle width direction having a gap at a lower side of the upper end frame 26. Moreover, a stem supporting portion 23 penetrating through the upper end frame 26 to extend upward is provided at a center in a width direction of the upper end frame 26 and the rear cover frame 28.

The rear cover frame 28 includes a bottom surface extending in the vehicle width direction between the right and left side frames of the upper frame 22 and both side surfaces or a rear surface extending upward from both side edges or a rear edge of the bottom surface, and front portions of the both side surfaces are connected to the right and left side frames (22). An area between a front edge of the bottom surface of the rear cover frame 28 and the upper end frame 26 is closed by a front surface inclined along the right and left side frames (22), so that a hollow square tube-shaped reinforcement structure extending in the vehicle width direction is formed and an inner space opening between the rear cover frame 28 and the upper end frame 26 can be used as a pocket-like article accommodation portion.

The stem supporting portion 23 has a hollow cylindrical shape in which a lower end terminates at the bottom surface of the rear cover frame 28, and a lower end portion of a stem 31 of a rear handle 3 is slidably supported in an upper and lower direction and fixed by a locking means (not shown) with an adjustable height. In an illustrated example, the stem 31 and the stem supporting portion 23 have flat cylindrical shapes in the vehicle width direction (non-rotating body shape), which constitutes a retention portion of the rear handle 3.

Figure 2:
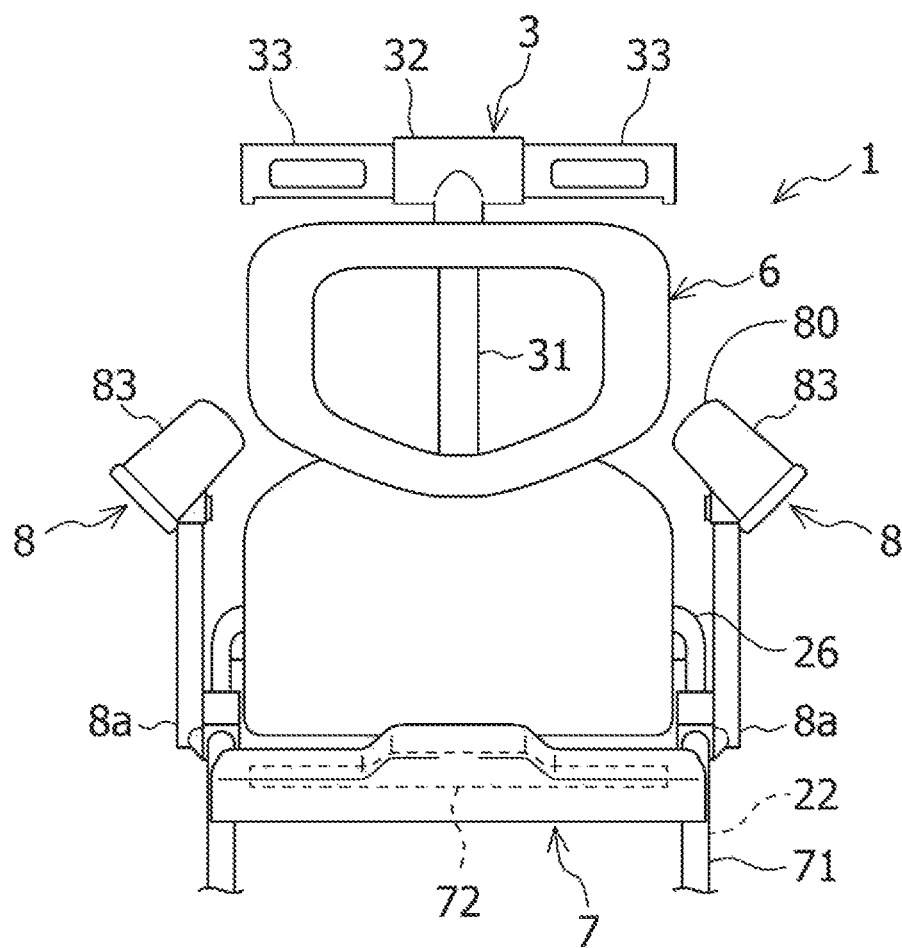
FIG. 2 is a front view showing the electric vehicle according to the embodiment of the present invention in which a lower portion is omitted.
Figure 3:
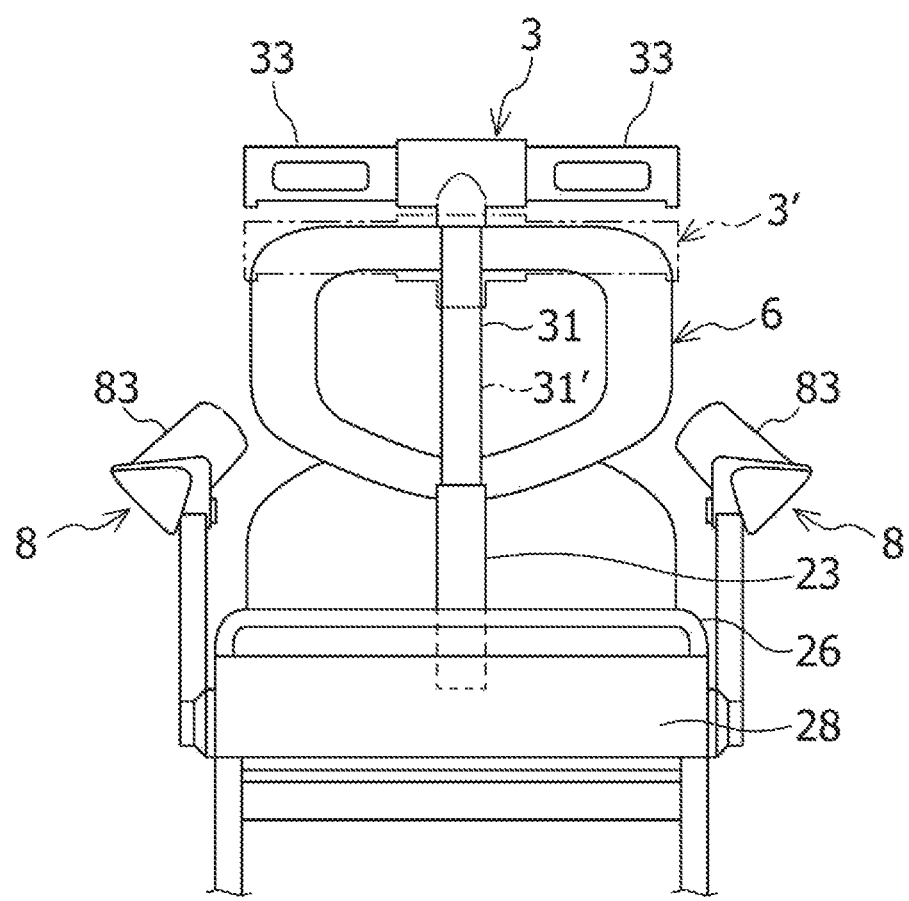
FIG. 3 is a rear view showing the electric vehicle according to the embodiment of the present invention in which a lower portion is omitted.

As shown in FIG. 2, the rear handle 3 has a T-bar shape having a pair of rear operating parts 33 extending to the right and left from a connecting portion 32 with an upper end of the stem 31. These rear operating parts 33 are an operating part in a case in which a user uses in the electric walking aid vehicle mode and in a case in which a caregiver or the like operates the electric vehicle in a state in which the user is seated at a seat 7.

Additionally, a harness for a signal line, a conductive line and the like from the rear operating parts 33 of the rear handle 3 with an adjustable height is flexibly routed at a side of the vehicle body inside the stem supporting portion 23 from the lower end portion of the stem 31 housed in the stem supporting portion 23. Moreover, a lower portion of the stem supporting portion 23 is positioned inside the rear cover frame 28, which is also advantageous when an inner space of the rear cover frame 28 adjacent to the stem supporting portion 23 is used for wiring connection or a mounting space of baseplate components.

Furthermore, the rear cover frame 28 is also adjacent to a pivot support portion (8a) for an arm rest 8, which will be explained later, to the upper frame 22, which is also advantageous for use in connection for flexible wiring of the harness for the signal line or the conductive line or the like from the operating part 83 of the arm rest 8.

In the upper frame 22, a lower end portion of a seat back 6 (6a), a leg portion 71 of the seat 7 (a seat cushion) (7a) and a base portion of the arm rest 8 (8a) are all pivotally supported by axes 6a, 7a, 8a which are parallel to the vehicle width direction, while a lower end of the leg portion 71 is pivotally and slidably coupled to the front base 25 (pin) via a coupling portion 7b (a slot.)

With the above configuration, when the seat 7 is pivoted forwardly downward to be moved to a folded position 7' as shown in the phantom lines in the figures from the small electric vehicle mode shown in solid lines in the figures, the front base 25 is slid rearward and the moving base is shortened, which causes the electric walking aid vehicle mode in which the user can operate by the rear operating parts 33 while standing and walking.

In this case, when the seat back 6 is inclined forward to move to a folded position 6', an upper surface (a rear surface) of the seat back 6' can be used as a mounting space for packages, and the arm rest 8 can be used as an anti-drop guard of the mounted packages. Also, upper surfaces 24b, 25b of the rear base 24 and the front base 25 can be used as a tray for mounting packages.

Also, in the electric walking aid vehicle mode shown in the phantom lines in the figures, the seat back 6' is raised to return to a seating position 6 and then the seat 7' is pivoted rearward to return to a seating position 7, as shown in the solid lines in the figures, the front base 25 is slid forward and the moving base 21 is extended, which causes the small electric vehicle mode in which the user is seated at the seat 7 to be capable of free-running by an operation of the operating part 83 of the arm rest 8.

In the seating position 6, the seat back 6 is preferably configured to be supported from rearward by the stem 31 or the stem supporting portion 23 of the rear handle 3. With this configuration, without the need to provide an additional supporting structure, the seat back 6 can obtain a stable supporting rigidity.

The operating part 83 is provided at a tip portion of the arm rest 8, and is constituted by a handle or a joystick extending forward and upward diagonally from the tip portion. The operating part 83 may be an operating part with a system in which the right and left motors 40L, 40R are allocated to the right and left handles to execute forward movement, backward movement, right and left rotation and pivot turn, or an operating part with a joystick system in which either of the right and left handles executes forward movement, backward movement and right and left rotation, and moreover, a display portion 80 for displaying a variety of types of information is provided at a tip portion of one (or both) of the operating parts 33.

Figure 4:
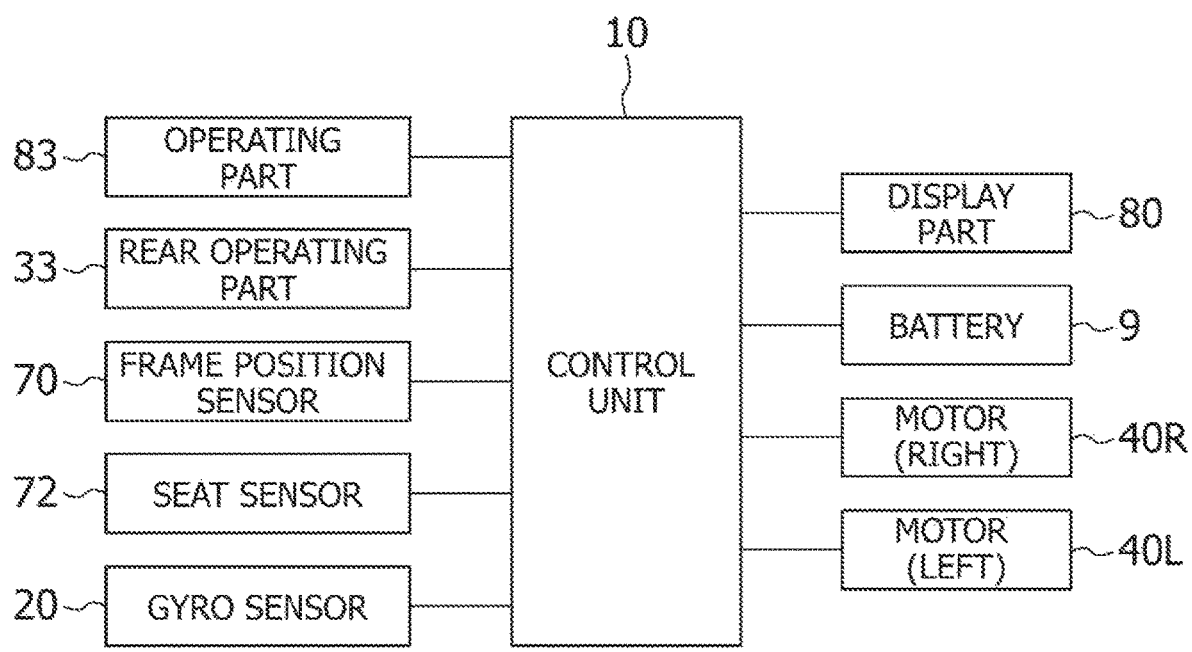
FIG. 4 is a block diagram showing a control system of the electric vehicle according to the embodiment of the present invention.
Figure 5:
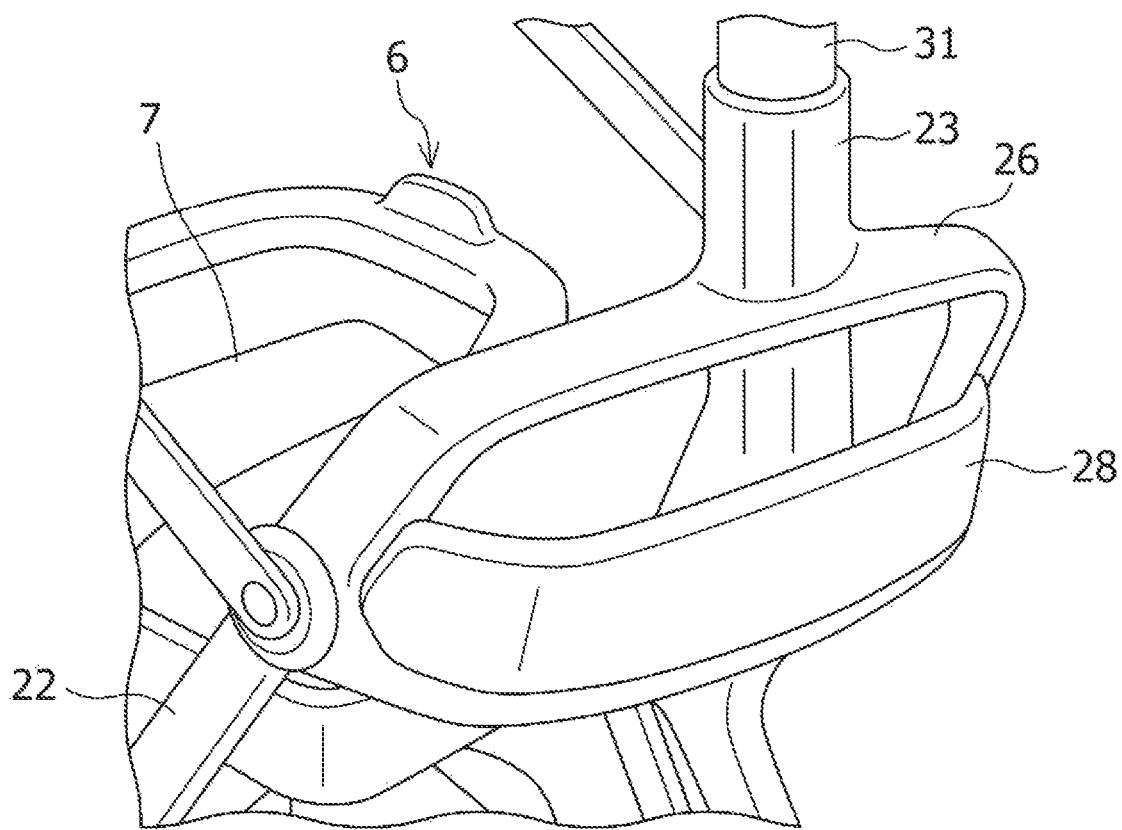
FIG. 5 is a perspective view of a stem supporting portion of the electric vehicle according to the embodiment of the present invention seen from backward.

FIG. 4 is a block diagram showing a control system of the electric vehicle. To a control unit 10, in addition to an operating input from the operating part 83 of the arm rest 8 and the rear operating parts 33, a variety of information, such as seating/folded position information detected by a frame position sensor 70, passenger information detected by a seat sensor 72, vehicle attitude information such as an acceleration rate or inclination detected by a gyro sensor 20 and a remaining amount of a battery 9 (state of charge, SOC) is input and displayed on the display portion 80.

In the control unit 10, when the seating position of the seat 7 is detected by the frame position sensor 70 and seating of the user is detected by the seat sensor 72, an operation of the operating part 83 of the arm rest 8 is enabled, and a "free-running mode" is displayed on the display portion 80. Also, in this state, when moving to an "assisted running mode" with the user on board is performed due to an operation from the rear operating parts 33, the "assisted running mode" is displayed on the display portion 80.

On the other hand, when the folded position of the seat 7 is detected by the frame position sensor 70, an operation of the rear operating parts 33 is enabled, and a "walking aid mode" is displayed on the display portion 80. Additionally, when the seat 7 is positioned at the middle of the seating/folded position and neither the seating position nor the folded position is detected by the frame position sensor 70, an operation of the operating part 83 of the arm rest 8 and an operation of the rear operating parts 33 are disabled.

Additionally, while a case in which the omni wheel is used as the front wheel 5 is shown in the above embodiment, a driven wheel steerably supported by a caster system or the like may be used.

As described above, while the embodiment of the present invention has been explained, the present invention is not limited to the above embodiment, and additionally, various modifications and changes may be performed based on the technical concept of the present invention.

REFERENCE SIGNS LIST

1 Electric vehicle
2 Vehicle body
3 Rear handle
4 Rear wheel
5 Front wheel
6 Seat back
7 Seat
8 Arm rest
10 Control unit
21 Moving base
22 Upper frame
23 Stem supporting portion
24 Rear base
25 Front base
26 Upper end frame
28 Rear cover frame
31 Stem
33 Rear operating part
40 Motor
83 Operating part

The invention claimed is:

1. An electric vehicle comprising:
a moving base which includes a front base with front wheels and a rear base with rear wheels, the front base and the rear base being coupled to be extendable in a front-rear direction of a vehicle;
an upper frame in which upper ends of a right and left pair of frames provided upward from both right and left side portions of the rear base are coupled by an upper end frame extending in a vehicle width direction;
a seat configured to be movable between a seating position and a folded position, in which the seat is pivotally supported around an axis in the vehicle width direction by the upper frame, and a leg portion extending downward exceeding a pivot support portion of the seat is coupled to the front base pivotally and slidably;
a seat operating part configured to be operable by a user seated at the seat; and
a rear operating part configured to be operable by the user in a standing and walking attitude from behind the seat,
wherein the upper frame includes a rear cover frame extending in the vehicle width direction having a gap at a lower side of the upper end frame and a cylindrical stem supporting portion which extends up and down penetrating through the upper end frame having a lower end which terminates at a bottom surface of the rear cover frame, and an article accommodation portion is formed between the upper end frame and the rear cover frame, and
the rear operating part is provided on a rear handle supported with an adjustable height by the stem supporting portion.

2. The electric vehicle according to claim 1, wherein the seat is configured to be in the seating position at an extended position of the moving base in which the front base and the leg portion are positioned at a side away from the rear base, and the seat is in the folded position inclining forward at a shortened position of the moving base in which the front base and the leg portion are positioned at a side of the rear base.

3. The electric vehicle according to claim 1, further comprising a seat back pivotally supported around an axis in the vehicle width direction by the upper frame above the seat, wherein the seat back is configured to be supported from rearward by a stem portion or the stem supporting portion of the rear handle at a seating position pivoted upward and rearward.

4. The electric vehicle according to claim 2, further comprising a seat back pivotally supported around an axis in the vehicle width direction by the upper frame above the seat, wherein the seat back is configured to be supported from rearward by a stem portion or the stem supporting portion of the rear handle at a seating position pivoted upward and rearward.

* * * * *